(12) United States Patent
Thomas

(10) Patent No.: US 7,112,014 B2
(45) Date of Patent: Sep. 26, 2006

(54) DOOR LOCK SET INSTALLATION JIG

(75) Inventor: Rickey J Thomas, Lineboro, MD (US)

(73) Assignee: Black & Decker Inc., Newark, DE (US)

(*) Notice: Subject to any disclaimer, the term of this patent is extended or adjusted under 35 U.S.C. 154(b) by 142 days.

(21) Appl. No.: 10/873,821

(22) Filed: Jun. 22, 2004

(65) Prior Publication Data

US 2005/0220548 A1 Oct. 6, 2005

Related U.S. Application Data

(60) Provisional application No. 60/559,341, filed on Apr. 2, 2004.

(51) Int. Cl.
*B23B 47/28* (2006.01)

(52) U.S. Cl. .................. 408/1 R; 408/103; 408/115 R

(58) Field of Classification Search .............. 408/97, 408/103, 115 R, 115 B, 72 R, 72 B, 241 B; B23B 47/28
See application file for complete search history.

(56) References Cited

U.S. PATENT DOCUMENTS

| | | | |
|---|---|---|---|
| 2,033,072 A * | 3/1936 | Harp ........................ | 408/97 |
| 2,268,930 A | 1/1942 | Edwards | |
| 3,327,573 A | 6/1967 | Prussiano | |
| 4,093,394 A * | 6/1978 | Adams ........................ | 408/103 |
| 4,594,032 A * | 6/1986 | Warburg .................. | 408/115 R |
| 4,715,125 A | 12/1987 | Livick | |
| 4,813,826 A | 3/1989 | Riedel | |
| 4,815,215 A | 3/1989 | Saylor et al. | |
| 5,146,961 A * | 9/1992 | Schoeller .................... | 144/3.1 |
| 5,222,845 A | 6/1993 | Goldstein et al. | |
| 5,569,001 A * | 10/1996 | Brutscher et al. ....... | 408/115 R |
| 6,193,449 B1 | 2/2001 | Diaz | |
| 6,254,320 B1 | 7/2001 | Weinstein et al. | |
| 6,343,632 B1 | 2/2002 | Zivojinovic | |
| 6,390,738 B1 * | 5/2002 | Fridman ..................... | 408/103 |
| 6,398,465 B1 | 6/2002 | Monge | |
| 6,910,837 B1 * | 6/2005 | Trettin et al. ........... | 408/115 B |
| 2004/0240950 A1 * | 12/2004 | Trettin et al. ........... | 408/115 R |

FOREIGN PATENT DOCUMENTS

CA 2 438 416 2/2004

* cited by examiner

*Primary Examiner*—Daniel W. Howell
(74) *Attorney, Agent, or Firm*—Harness, Dickey & Pierce, P.L.C.

(57) ABSTRACT

An installation jig has a body member and a clamping mechanism. The clamping mechanism along with the body are clamped onto a door. The body includes a plurality of walls with one wall having an aperture enabling passage of a tool which may drill a hole into a door at a desired standard lock set size. Also, the body includes an aperture to enable a lock bolt hole to be drilled into the door at a plurality of standard door thickness.

20 Claims, 5 Drawing Sheets

DOOR LOCK SET INSTALLATION JIG

CROSS-REFERENCE TO RELATED APPLICATION

This application claims the benefit of U.S. Provisional Application No. 60/559,341, filed on Apr. 2, 2004. The disclosure of the above application is incorporated herein by reference.

FIELD OF THE INVENTION

The present invention relates to lock set installation and, more particularly, to an apparatus or jig to provide proper alignment to bore holes in a door to install a lock set assembly.

Installation jigs to install lock sets are known in the art. Examples of such jigs are illustrated in U.S. Pat. Nos. 6,398,465 to Monge and U.S. Pat. No. 2,763,299 to Cerf. The Monge patent illustrates an installation jig which includes a pair of jaws and a latch guide coupled together by an adjusting mechanism. The latch guide is somewhat complicated, however, it appears to work satisfactory for its intended purpose. The patent to Cerf illustrates a lock installation tool which only provides for a single back set. While these patents provide satisfactory apparatus, designers are always striving to improve the art.

The present invention provides the art with a simple lock set installation jig which is easily adjustable to fit onto a door. The jig enables receipt of both standard types of lock sets. The invention has a clamping mechanism to tighten the apparatus onto a door. The apparatus enables proper positioning of the bolt hole onto the thickness of the door.

From the following detailed description taken in conjunction with the drawings and subjoined claims, other objects and advantages of the present Invention will become apparent to those skilled in the art.

DETAILED DESCRIPTION OF THE PREFERRED EMBODIMENTS

Figure 1:
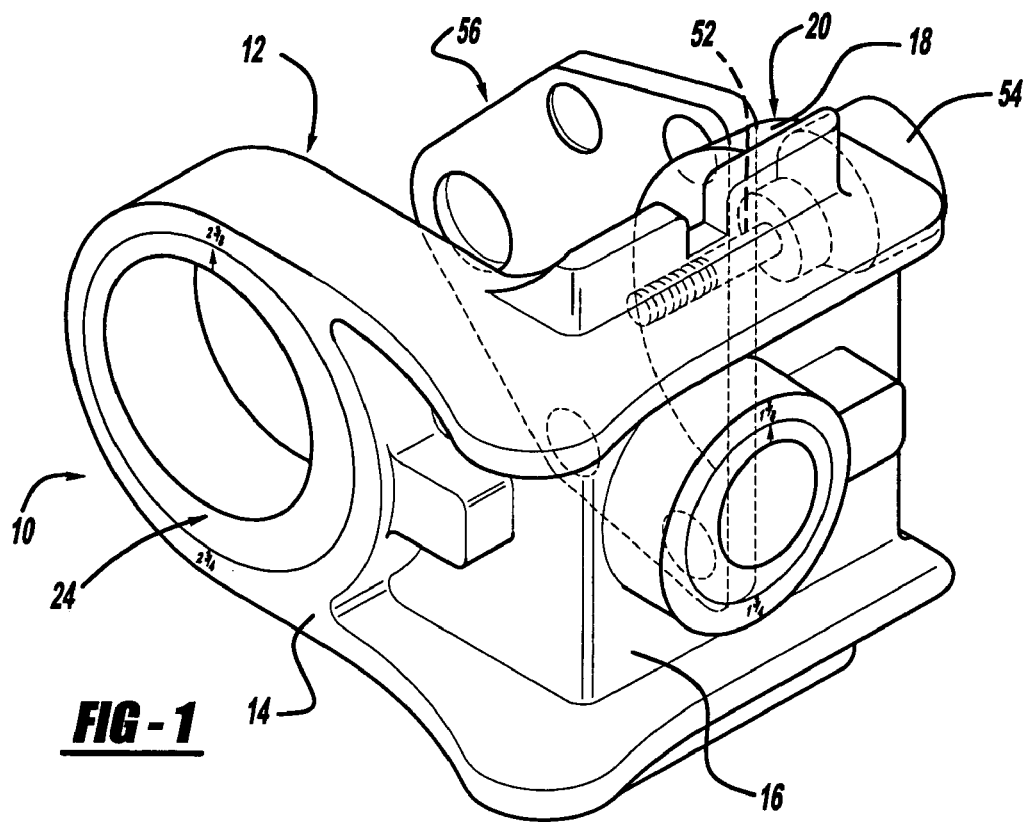
FIG. 1 is a perspective view of a lock set installation jig in accordance with a first embodiment of the present invention.
Figure 3:
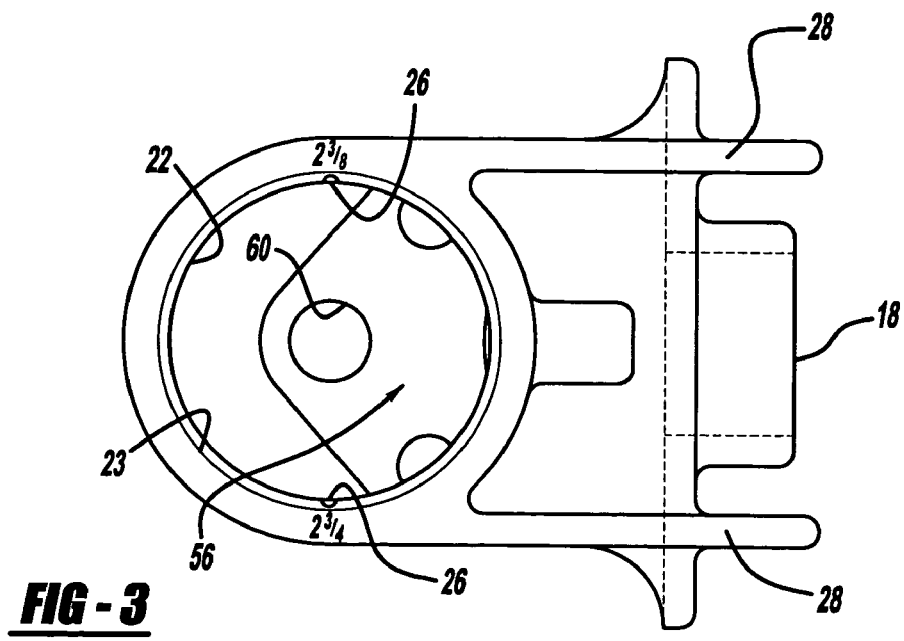
FIG. 3 is a side plan view of FIG. 1.
Figure 2:
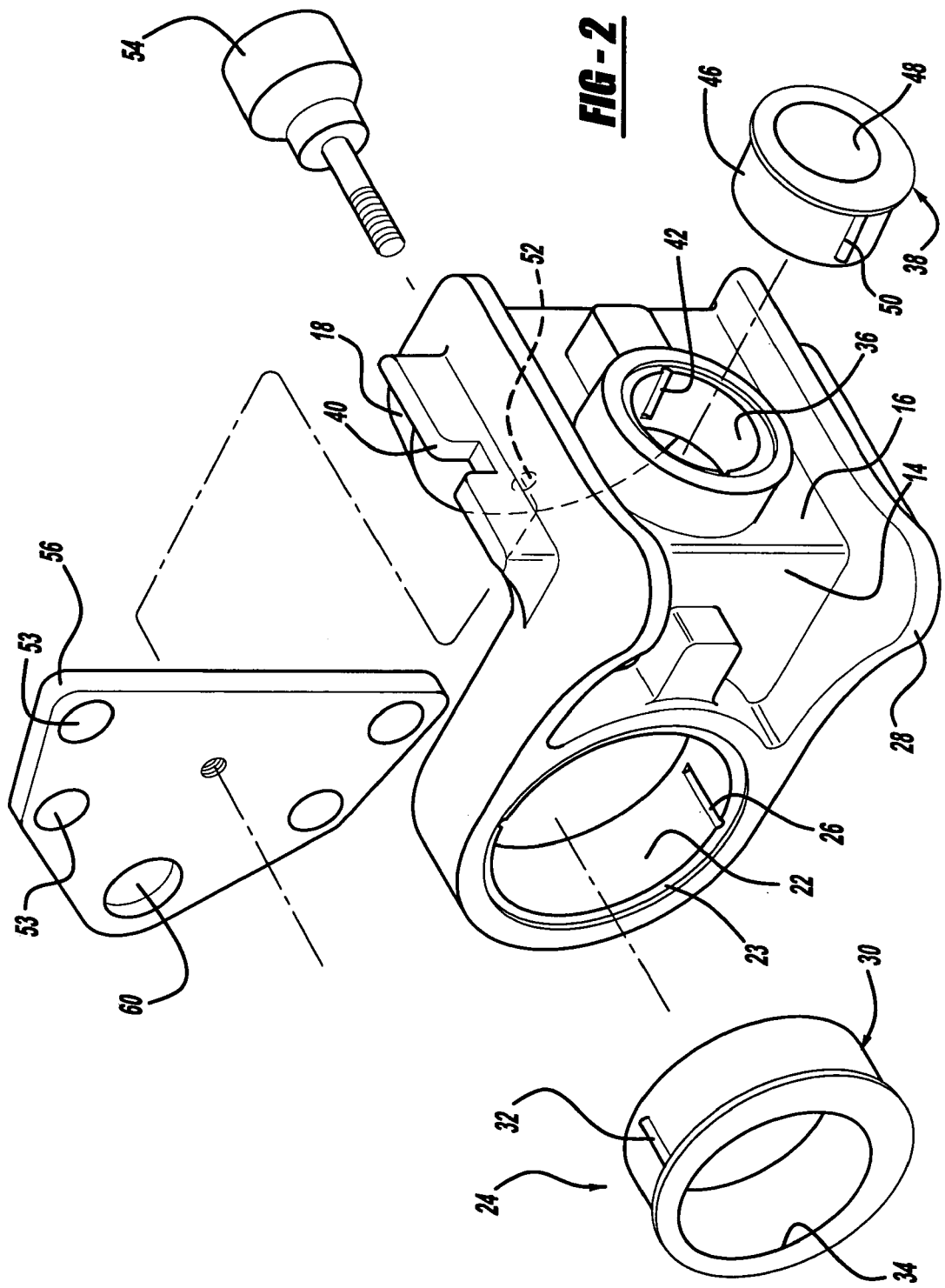
FIG. 2 is a perspective exploded view of a lock set installation jig in accordance with a first embodiment of the present invention.

Turning to the Figures, a first embodiment of the invention is shown and designated with the reference numeral 10. The jig 10 includes a body 12 having an overall U-shape with one leg shorter than the other. Wall 14 is a leg of the U while wall 16 is the web of the U and wall 18 is a leg of the U which is shorter than leg 14. The body 12 may be molded from a plastic material or cast from a metallic material. A clamping mechanism 20 is coupled with the wall 18.

The first wall 14 includes an aperture 22 to receive a sleeve 24. The aperture 22 includes at least one, preferably a plurality of retention recesses 26 to retain the sleeve 24 within the aperture 22. The recesses 26 may have the same or different sizes to enable proper positioning of the sleeve 24 into the aperture 22. The aperture 22 includes a shoulder 23 to prohibit the sleeve 24 from passing through the aperture 22. The wall 14 includes a plurality of ribs 28 which provide structural reinforcement to the wall 14. Also, the wall 14 includes indicia to enable the sleeve to be placed within one of two positions, which fit the standard two inch and three-eights or two inch and three-quarter door lock sets.

The sleeve 24 has a cylindrical body 30 with at least one, and preferably a plurality of teeth 32 matching the number of recesses 26 in the aperture 22. The cylindrical body 30 includes an aperture 34 which is offset with respect to the cylindrical body 30. The offset of the aperture 34 enables the sleeve 24 to be removed from the aperture 22 and rotated to a second position to provide the two different positions for the two standard lock sets.

Figure 4:
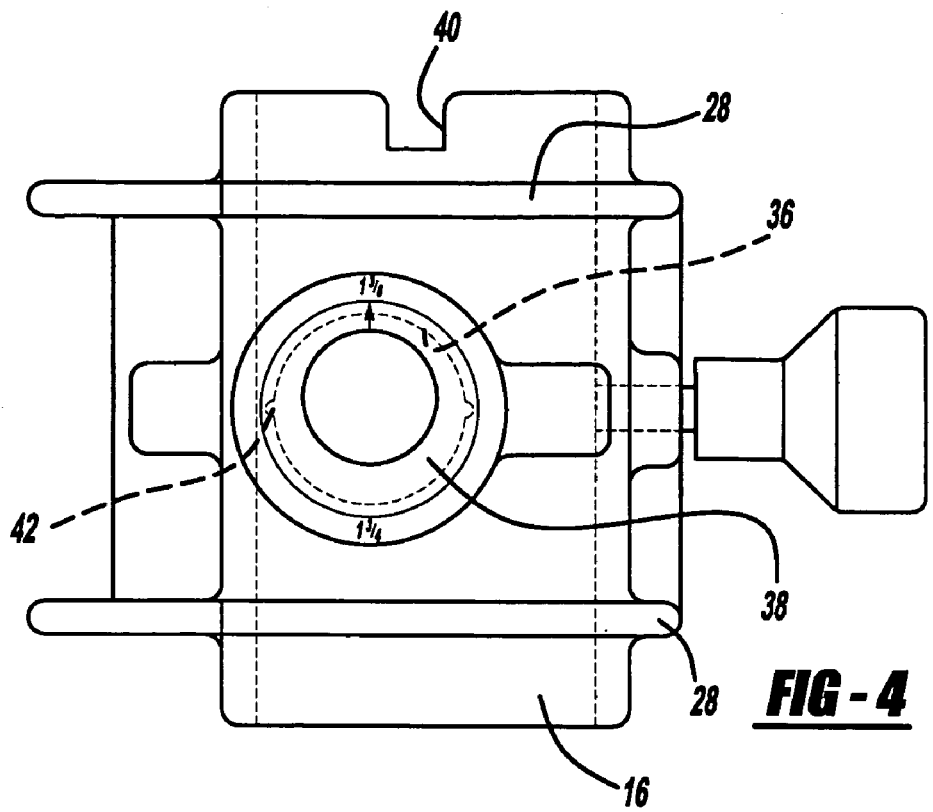
FIG. 4 is a side plan view of the installation apparatus of FIG. 1.

The second wall 16 is continuous with the first wall 14 and is also perpendicular to it. The second wall 16 includes an aperture 36 to receive a sleeve 38. Also, the wall 16 includes a cutout 40 which acts as a depth gauge to set the proper depth of a pilot drill bit projecting from a hole saw. The ribs 28 are continuous around the second wall 16, as seen in FIG. 4. The aperture 36 includes recesses 42 to position the sleeve 38 in the aperture 36. Also, the wall 16 includes indicia to identify to the user the door thickness which, in turn, positions the sleeve aperture 46 so that the to be drilled bolt hole is centered on the door thickness.

The sleeve 38 includes a body 46 which includes an offset aperture 48. The body 46 includes at least one, and preferably a plurality of teeth 50 on its outer circumferential surface. The teeth engage the recesses 42 in the aperture 36 to retain and position the sleeve 38 within the aperture. The sleeve 38 includes indicia to enable proper alignment of the sleeve 38 for the desired door thickness. Accordingly, the sleeve 38 can be removed from the aperture 36 and rotated to provide the desired lock bolt hole position.

The third wall 18 includes a threaded aperture 52. The threaded aperture receives a thumb screw 54 of the clamping mechanism 20.

The clamping mechanism 20, along with the thumb screw 54, includes a block member 56. The block member 56 is secured to the thumb screw 54. Thus, as the thumb screw 54 is rotated, the block member 56 moves toward and away from the wall 14. Thus, a door is clamped between the block member 56 and the wall 14.

The block member 56 may include nibs or tabs 58 manufactured from a resilient elastomeric material to provide a mark free securement with the door. Also, a positive stop disk 60 is positioned in block 56. The positive stop disk 60 is generally manufactured from a metallic material. Accordingly, as the drill bit of a hole saw is bored into the door, the drill bit of the hole saw contacts the stop disk 60 before the hole saw exits the other side of the door. When this happens, the user knows that the hole saw has reached approximately half-way through the door. Thus, at this time, the hole saw and jig are removed so that the user can finish drilling the hole from the other side of the door by placing the pilot drill in the previously drilled hole.

Turning to FIGS. 5 through 8, a second embodiment of the present invention is shown. In the second embodiment, features that are the same will be marked with the same reference numerals.

Figure 5:
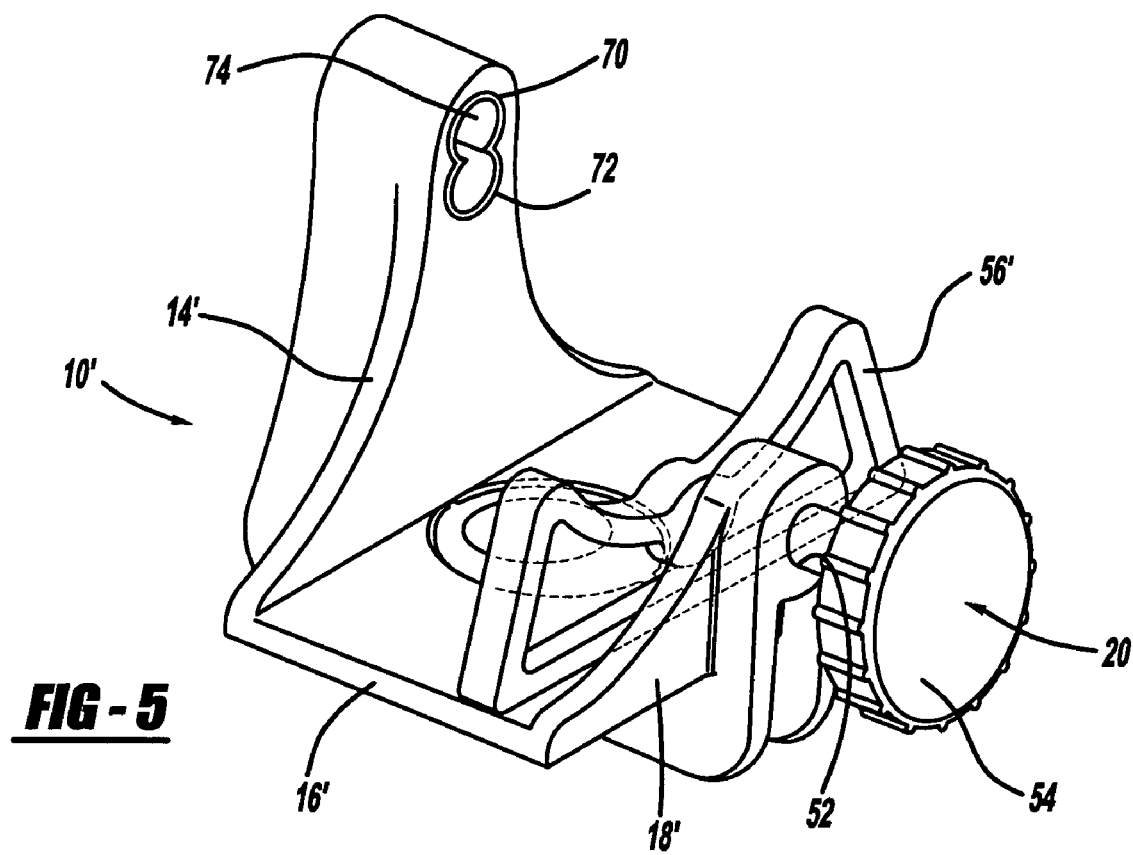
FIG. 5 is a perspective view of an installation jig in accordance with a second aspect of the present invention.
Figure 6:
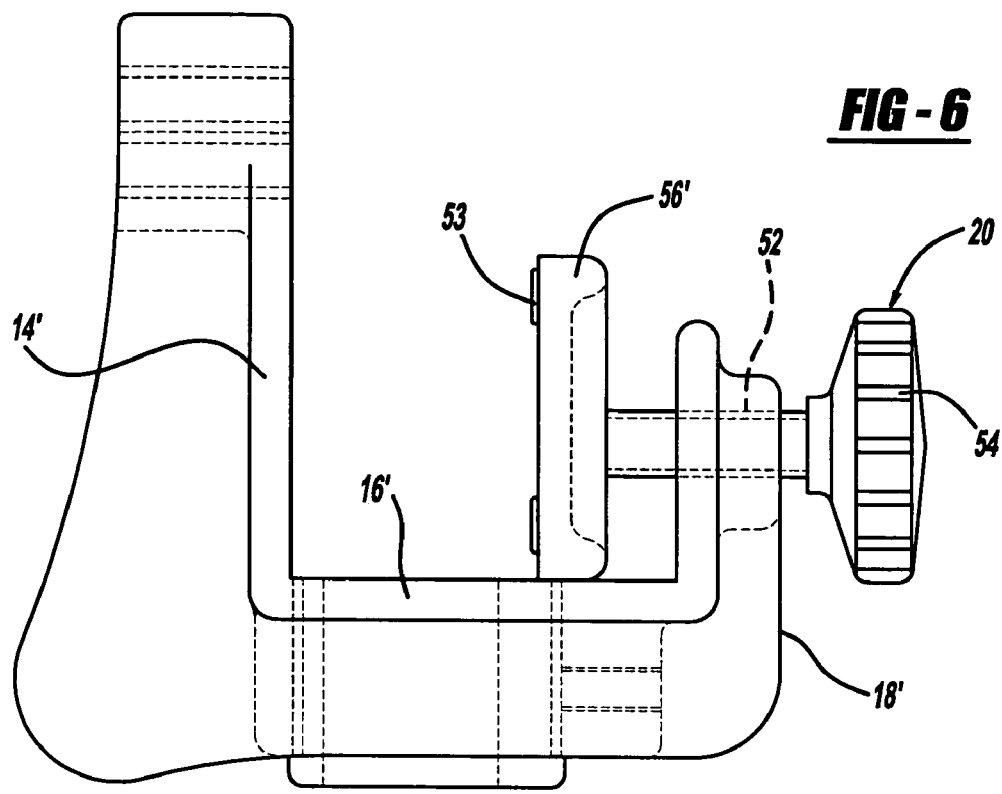
FIG. 6 is a top plan view of FIG. 5.
Figure 8:
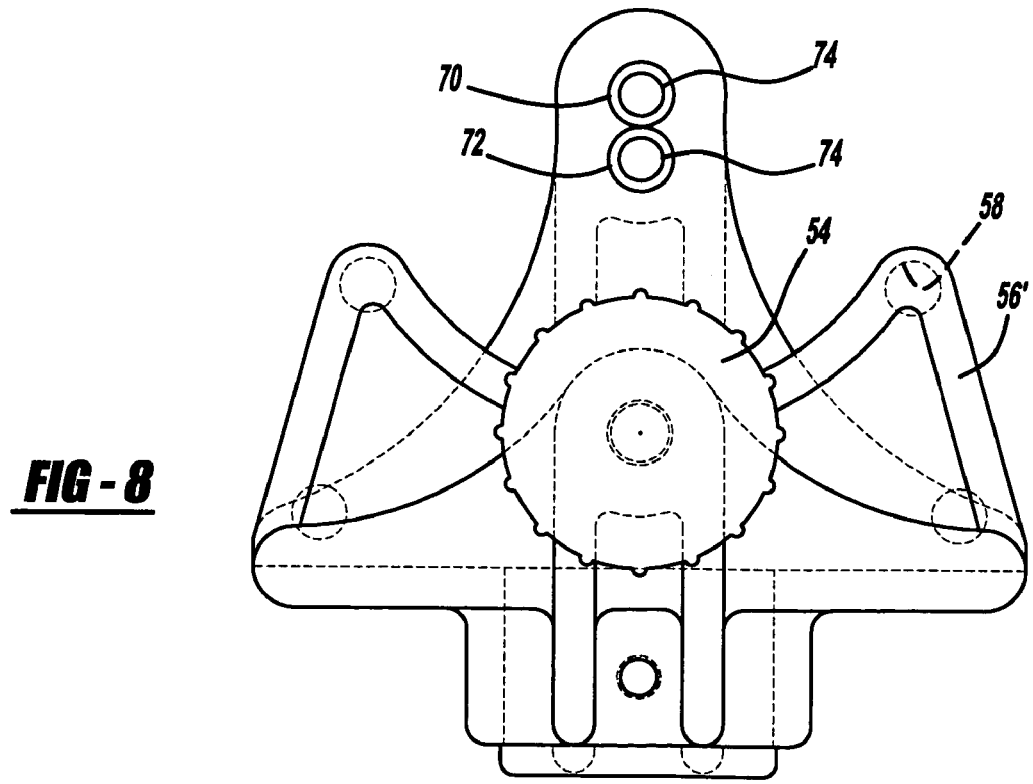
FIG. 8 is a side plan view of the jig of FIG. 5.

FIG. 5 illustrates an installation jig which is designated with the reference numeral 10'. The jig 10' has an overall U-shape with first wall 14', a second wall 16' and a third wall 18'. The walls 16' and 18' are substantially the same as those previously disclosed, however, the rib orientation is different from that of the first embodiment.

The wall 14' has a pair of apertures 70 and 72 which may be separate or may be continuous with one another. The apertures 70 and 72 include a sleeve mechanism 74 which is generally manufactured from a metallic material to enable passage of a drill bit. The wall 14' includes indicia to identify the apertures 70 and 72 which receive the drill bit. Here, a hole saw is not used. A drill bit is inserted into either one of the apertures 70, 72 to provide a starting bore for the hole saw drill bit at one of the two standard lock set sizes. Thus, with a hole drilled in the door, the user can then position the hole saw on one side of the door, drill half way, and then place the hole saw on the other side of the door to cut through and finish a hole in the door.

Figure 7:
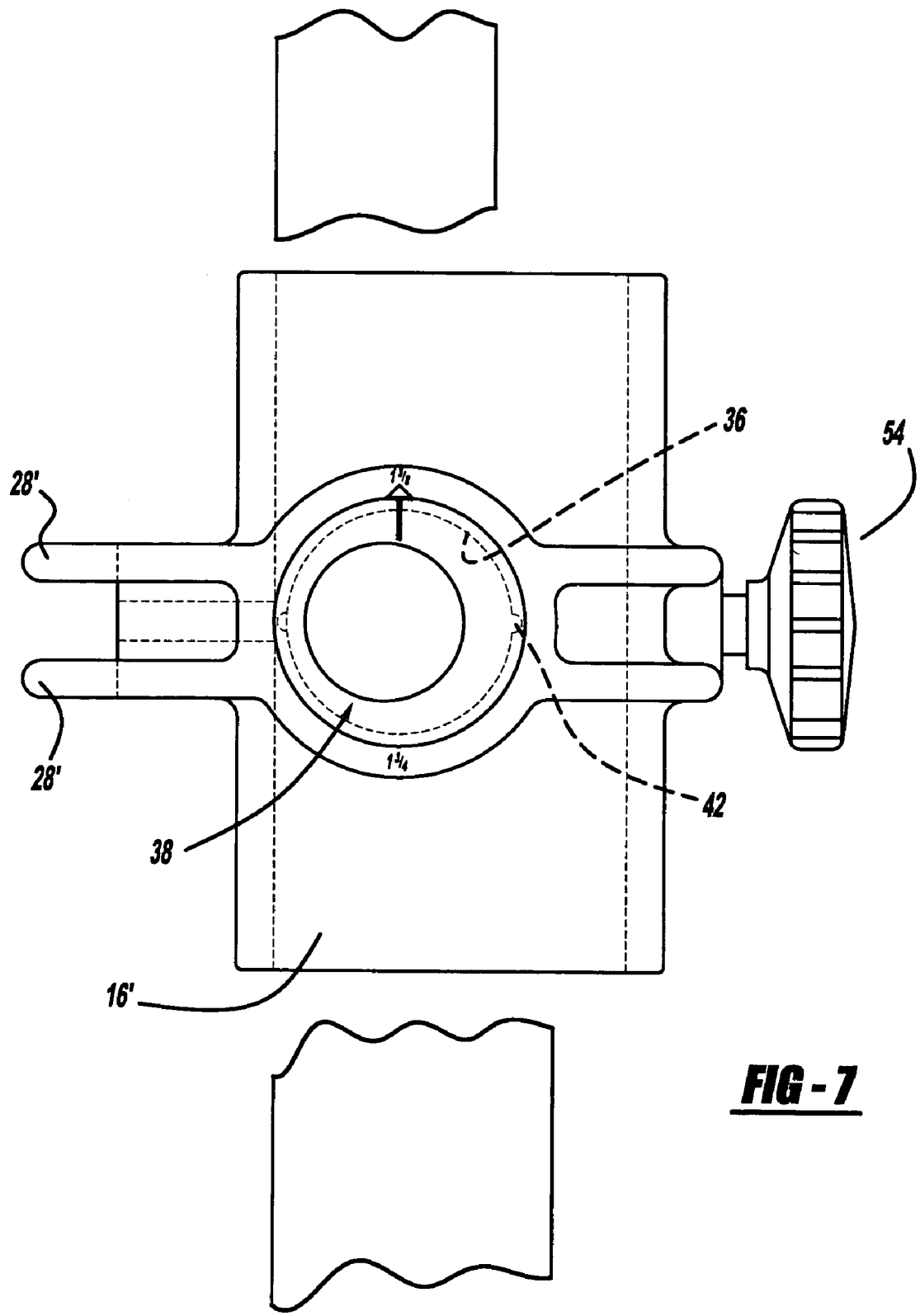
FIG. 7 is a side plan view of the installation jig of FIG. 5.

FIG. 7 illustrates wall 16'. The wall 16' is like that of previously described wall 16 and includes sleeve 38. The wall has an aperture 36 which receives the sleeve 38, as well as recesses 42 to receive the teeth 50 of the sleeve 38. The wall 16' includes indicia to identify which standard door thickness the jig is to be positioned on.

The wall 18' is substantially similar to the wall 18 and includes a threaded aperture 52. The clamping mechanism 20' is similar to that previously disclosed having a thumb screw 54. The thumb screw is connected to a block member 56' which includes nibs 58 which contact a door. The block member 56' has a configuration which enables the drill to pass through the door. The block member 56' does not include a positive stop disk like that in the previous embodiment.

The installation jig 10' enables a drill bit to be passed through a door at the desired position. After the drill bit passes through the door, a second drill bit would be passed into the lock bolt sleeve 38. After this, the jig 10' would be removed and a hole saw would have its drill bit positioned into the hole in the door. At this time, the hole saw would enter half-way through the door, be removed and then enter the opposite side of the door to finish drilling the hole through the door.

The present invention provides a jig which can be positively positioned onto a door. The jig includes a clamping mechanism to secure the jig to the door. In one embodiment, the entire hole saw can be bored into the door and in the other embodiment a bore is drilled in the door into which the drill bit of the hole saw can be placed.

In light of the above detailed description, those skilled in the art will appreciate that variations, modifications or alteration may occur without deviating from the scope and spirit of the present invention.

What is claimed is:

1. A door lock set installation jig comprising:
    a U-shaped body member;
    an aperture in one leg of said U-shaped body member;
    an aperture in a web of said U-shaped body member;
    a clamping mechanism on one leg of said U-shaped member for securing said U-shaped member on a door;
    a mechanism in said web aperture for centering a bore in said mechanism on a plurality of different thickness doors.

2. The door lock set installation jig according to claim 1 further comprising a sleeve in said leg aperture, said sleeve having a bore, said sleeve being adjustable for positioning said bore at a plurality of positions for accommodating a plurality of different sizes of door lock sets.

3. The door lock set installation jig according to claim 1 further comprising a drill stop member positioned on said clamping mechanism.

4. The door lock set installation jig according to claim 1 wherein said leg aperture adapted to receive a plurality of drill bits wherein said plurality of drill bits are received such that the drill bits are positioned in said leg aperture adjacent with respect to one another.

5. The door lock set installation jig according to claim 1 wherein said body member includes a depth gage for setting a depth of a pilot drill bit of a hole saw.

6. The door lock set installation jig according to claim 1 wherein said mechanism being a sleeve having an eccentric bore.

7. The door lock set installation jig according to claim 2 wherein a wall defining said leg aperture includes a stop for preventing through passage of said sleeve.

8. The door lock set installation jig according to claim 1 wherein a wall defining said web aperture includes a stop for preventing through passage of said mechanism.

9. The door lock set installation jig according to claim 1 wherein a wall defining said web aperture includes an alignment device cooperating with an alignment member on said mechanism.

10. The door lock set installation jig according to claim 2 wherein a wall defining said leg aperture includes an alignment device for coupling with an alignment member on said sleeve.

11. The door lock set installation jig according to claim 1 wherein said U-shaped body member including a reinforcement member.

12. A method of drilling holes in a door for securing a lock set to the door comprising:
    providing an installation jig;
    mounting the installation jig on the door;
    drilling a hole in the door for mounting a lock set;
    selecting a desired setting of a bolt hole device by rotatig a sleeve to a desired position;
    automatically centering the bolt hole device on the door based on the desired setting;
    drilling a bolt hole in the door for mounting the bolt mechanism.

13. The method according to claim 12 further comprising selecting a desired setting for drilling said lock set hole based on a desired size of the lock set.

14. A method of drilling holes in a door for securing a lock set to the door comprising:
    providing an installation jig;
    mounting the installation jig on the door by adjusting a clamping mechanism to mount said jig on the door;
    drilling a hole in the door for mounting a lock set;
    selecting a desired setting of a bolt hole device;
    automatically centering the bolt hole device on the door based on the desired setting; and
    drilling a bolt hole in the door for mounting the bolt mechanism.

15. The method according to claim 13 further comprising rotating a sleeve to select the desired lock set hole.

16. A door lock set installation jig comprising:
    a body member having a first wall with a first bore and a second wall with a second bore, said second wall being substantially perpendicular to said first wall;
    a sleeve positionable in said first or second bore, said sleeve having a mechanism for retaining said sleeve in said first or second bore, and said sleeve including an offset bore, said sleeving being multi-positionable in said first or second bore for enabling holes to be drilled in doors which correspond to various lock set sizes; and a mechanism for securing said body member to a door.

17. The method according to claim 12 further comprising inserting a drill into the door until the drill contacts a stop on said jig.

18. The method according to claim 12 further comprising inserting a drill into said door through said door lock set hole and removing said jig and entering a hole saw in said hole for sawing the door lock set hole in the door.

19. The method according to claim 12 further comprising removing said jig from the door.

20. The method according to claim 19 further comprising installing a lock set on the door.

* * * * *